Figure 1:
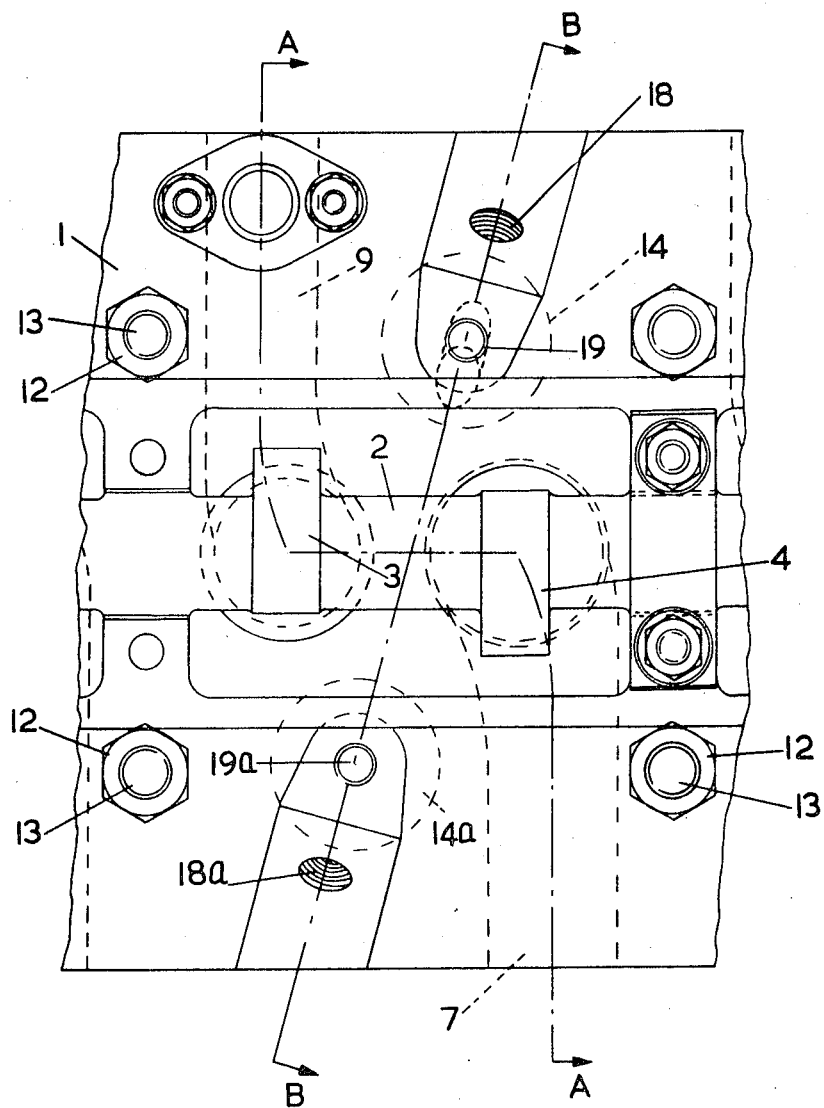

United States Patent
Goodacre

[15] 3,651,638
[45] Mar. 28, 1972

[54] INTERNAL COMBUSTION ENGINE

[72] Inventor: Charles Lindsay Goodacre, London, England

[73] Assignee: F.I.A.T. S.p.A., Turin, Italy

[22] Filed: July 8, 1970

[21] Appl. No.: 53,154

[30] Foreign Application Priority Data

July 8, 1969 Great Britain......................34,368/69

[52] U.S. Cl..............................60/39.6, 60/39.62, 123/191
[51] Int. Cl..........................................................F02g 1/00
[58] Field of Search......................60/39.6, 39.62, 39.82 C;
123/191 A, 32

[56] References Cited

UNITED STATES PATENTS

| | | | |
|---|---|---|---|
| 1,981,874 | 11/1934 | Mock | 123/32 |
| 2,127,222 | 8/1938 | Koch | 60/39.62 X |
| 2,275,756 | 3/1942 | Hanson | 60/39.62 |
| 2,520,378 | 8/1950 | Veit | 123/191 A |
| 2,656,830 | 10/1953 | Houdry | 123/191 A |
| 2,978,360 | 4/1961 | Bradstreet | 123/191 A |
| 3,060,915 | 10/1962 | Cole | 123/191 A |
| 3,408,995 | 11/1968 | Johnson | 123/191 A |
| 3,446,013 | 5/1969 | Wall | 60/39.6 X |
| 3,032,991 | 5/1962 | Vdoviak | 60/39.82 C |

*Primary Examiner*—Clarence R. Gordon
*Attorney*—Misegades & Douglas

[57] ABSTRACT

An otto-cycle internal combustion engine having at least one cylinder, a piston reciprocable in the cylinder, an inlet valve for admitting air into the cylinder for compression by the piston, a combustion chamber externally of the cylinder, fuel injector means for injecting fuel into the combustion chamber, transfer passage means communicating the combustion chamber with the cylinder and ignition means for igniting a fuel/air mixture in the combustion chamber, the arrangement being such that combustion takes place substantially completely outside the cylinder within the combustion chamber.

9 Claims, 3 Drawing Figures

INTERNAL COMBUSTION ENGINE

This invention relates to internal combustion engines.

A problem which is causing increasing worldwide concern is that of pollution of the atmosphere in which we live and in particular pollution of the atmosphere by the exhaust emissions from the engines of motor vehicles which operate on light hydrocarbon fuels emissions from internal combustion engines contain pollutants such as unburnt hydrocarbons, carbon monoxide and nitrogen oxides, and in an effort to reduce air pollution the United State of America and some other countries have introduced legislation whereby the maximum amounts of unburnt hydrocarbons, carbon monoxide and nitrogen oxides in the exhaust emissions from a vehicle must not exceed statutory limits. Although at the present time the amounts of the aforesaid pollutants in the exhaust emissions from most modern internal combustion engines can be kept within the statutory limits laid down as aforesaid by suitable adjustment of the engine, more stringent limits which are expected to become statutory within the next few years have already been announced by the authorities in the United States of America. These more stringent limits, which will have to be met by not only motor vehicle manufacturers in the United States but also by manufacturers in other countries who export to the United States, are such as to be unattainable by most, if not all, modern internal combustion engines for motor vehicles without seriously reducing the performance of the engine.

In an attempt to meet the more stringent limits various proposals have been put forward, such as the addition to the engine exhaust system of catalytic afterburner means, replacing the exhaust manifold of the engine by thermal reactor means or by injecting air into the exhaust parts and/or manifold of the engine. However all of these prior proposals have their disadvantages.

A major source of undesirable exhaust emissions from an internal combustion engine is unburnt fuel which originates as fuel condensate on the cylinder walls, piston crowns and cylinder head of the engine during operation thereof, which does not burn during combustion within the cylinders and which passes out of the engine cylinders with the exhaust.

It is the object of the present invention to provide an internal combustion engine adapted to operate on light hydrocarbon fuels and of such improved constructions that unburnt fuel in the exhaust therefrom can be at least substantially reduced so as to reduce undesirable exhaust emissions.

To this end the present invention provides an internal combustion engine comprising at least one cylinder, a piston reciprocable in said cylinder, means for admitting air into said cylinder for compression by the piston, a combustion chamber externally of the cylinder, fuel injector means for injecting fuel into the combustion chamber, transfer passage means communicating the combustion chamber with the cylinder and through which air compressed by the piston can pass into the combustion chamber to mix with fuel injected into the combustion chamber by the injector means and through which products of combustion to actuate the piston, and ignition means for igniting a fuel/air mixture in the combustion chamber, the arrangement being such that substantially at the moment ignition occurs the transfer passage means will be substantially closed by the piston so that combustion takes place substantially completely outside the cylinder within the combustion chamber.

Since the fuel is injected into the combustion chamber and not into the cylinder itself and since combustion takes place substantially complete outside the cylinder within the combustion chamber, little or no fuel condensate forms on the cylinder wall, piston crown and cylinder head during operation of the engine and accordingly it is possible, as compared with a conventional internal combustion engine, to substantially reduce the amount of unburnt fuel in the exhaust from the engine and so reduce undesirable exhaust emissions.

The internal combustion engine of the present invention is preferably an Otto-cycle engine, i.e., a four-stroke engine, although it could if desired be a two-stroke engine.

The said combustion chamber and said transfer passage means are preferably formed in the cylinder head of the engine, thus enabling a conventional internal combustion engine to be modified by replacement of the cylinder head and avoiding the expensive redesigning and re-tooling which would be necessary if the combustion chamber was to be formed in the cylinder block.

The combustion chamber is preferably a spherical or substantially spherical chamber, although it could be of any other suitable form, e.g., avoid or rhombohedral. If desired two or more combustion chambers may be associated with the or each cylinder of the engine.

The transfer passage means may be a passage which extends at any required angle with respect to the combustion chamber, e.g., may extend radially or tangentially with respect to the combustion chamber, and may be of any suitable size and form, e.g., may be a straight-sided passage having a diameter of from 10 to 100 percent of the diameter of the combustion chamber and a length of from 10 to 100 percent of the diameter of the combustion chamber or may have the form of a venturi or vena-contracta, the design of the transfer passage depending upon the performance requirements of the engine. If desired or necessary the transfer passage means may comprise two or more transfer passages which communicate the combustion chamber with the cylinder.

Means is preferably provided in the combustion chamber providing a surface onto which the fuel is injected by said injector means and upon which fuel may burn. Such means may comprise a ball, sphere or the like mounted in the center of the combustion chamber, e.g., on a pin extending radially or diametrically of the chamber, although the surface could be provided by other means, e.g., by the surface of a pin extending diametrically of the chamber. Said surface providing means preferably occupies from 10 to 50 percent of the volume of the combustion chamber.

Figure 2:
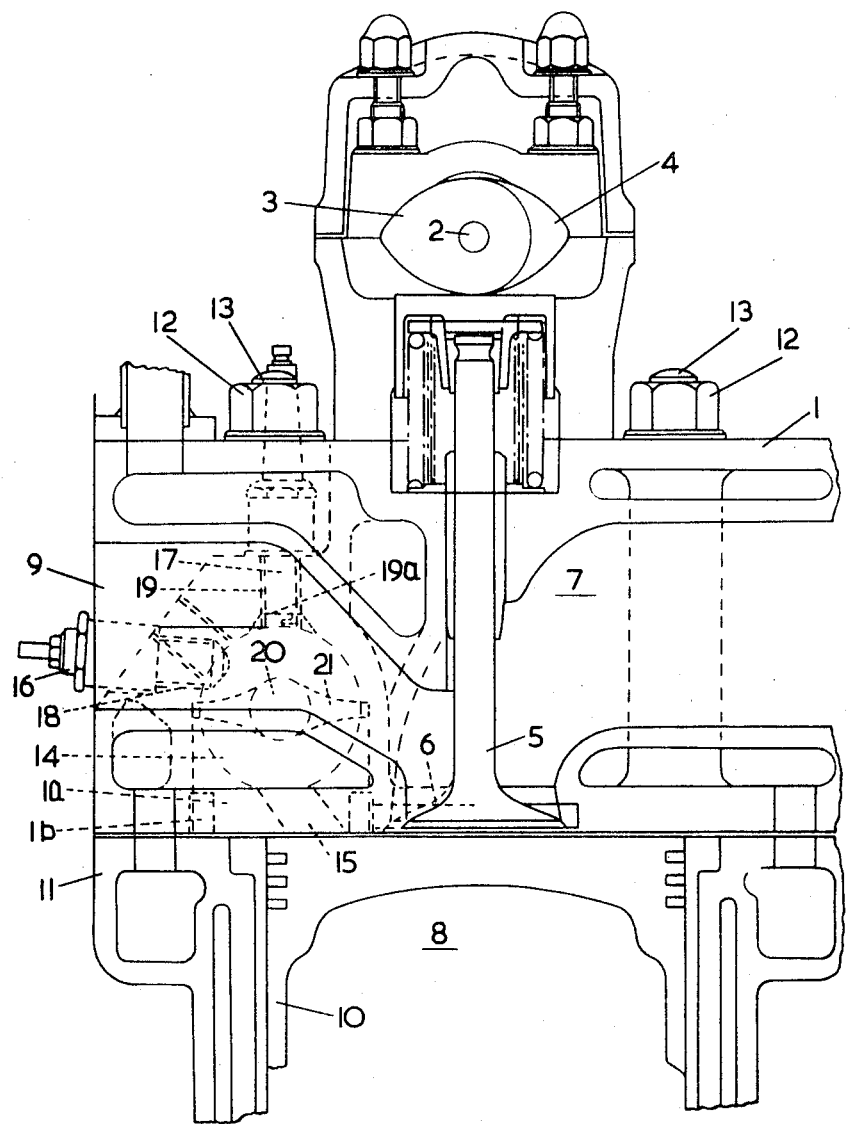
Figure 3:
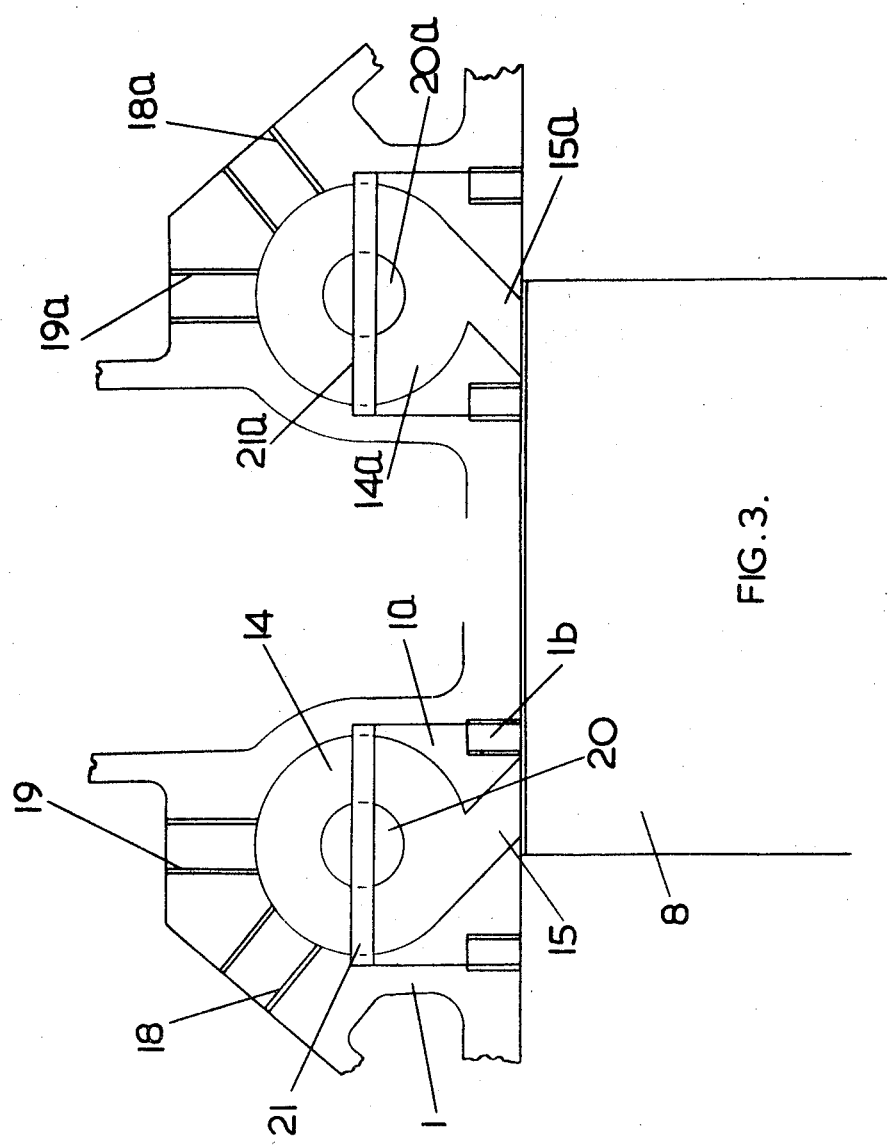

In order that the invention may be the more readily understood reference will hereinafter be made, by way of example, to the accompanying diagrammatic drawings, in which:

FIG. 1 is a fragmentary plan view of an Otto-cycle internal combustion engine according to the invention, FIG. 2 is a sectional elevation on line A—A of FIG. 1 and FIG. 3 is a sectional elevation on line B—B of FIG. 1.

Referring to the drawings it will be seen that the engine illustrated comprises a cylinder head 1 embodying a valve camshaft 2 having valve cams 3, 4 thereon adapted to actuate exhaust and air inlet valves 5, 6 respectively. Valve 6 controls communication between air inlet passage 7 and engine cylinder 8 whilst the valve 5 controls communication between the cylinder 8 and exhaust passage 9. A piston 10 is reciprocable in cylinder 8. The cylinder head 1 is secured to the cylinder block 11 of the engine by nuts 12 engaging threaded studs 13 in conventional manner.

Also embodied in the cylinder head 1 external to the cylinder 8 is a combustion chamber 14 which communicates with the cylinder 8 by way of a transfer passage 15.

The arrangement is such that when the piston 10 is at the full extend of its compression stroke it closes the transfer passage 15 as shown in FIG. 2. Preferably the arrangement is such that the crown of the piston 10 approaches to within say 1mm. of the inner surface of the cylinder head 1 around the transfer passage 15 and so, having regard to the high pressures prevailing in the combustion chamber 14 when the piston 10 is at the full extent of its compression stroke, forms an aerodynamic seal which effectively substantially seals-off the combustion chamber 14 from the cylinder 8. Alternatively or in addition the piston 10 may be provided with means adapted to cooperate with the transfer passage 15 and/or the cylinder head 1 to close the transfer passage 15 when the piston is at the full extent of its compression stroke.

The combustion chamber 14 is, for ease of manufacture and maximum thermal efficiency, a spherical chamber although it could be of any other suitable form, e.g., cylindrical.

The transfer passage 15 is, in the illustrated embodiment, a straight-sided passage which extends tangentially of the combustion chamber 14 so as to impart a swirl motion to air transferred by way of passage 15 from the cylinder 8 to the combustion chamber 14 during the compression stroke of the piston 10. The degree of air swirl in the chamber 14 is largely dependent upon the design of the transfer passage 15 and accordingly the transfer passage is designed in each case to give a degree of air swirl compatible with fuel characteristics and required engine performance.

Associated with the combustion chamber 14 is a fuel injector 16 for injecting fuel into the chamber and a sparking plug 17 for igniting a fuel/air mixture in the chamber 14, the fuel injector 16 being screwed into a threaded opening 18 in the wall of the combustion chamber and the sparking plug 17 being screwed into a threaded opening 19 terminating in a cavity 19a in the wall of the combustion chamber so that the electrode end of the sparking plug 17 is housed in the cavity, thus protecting the sparking plug from the high turbulances which may prevail in the combustion chamber.

Mounted at the center of the combustion chamber 14 is a member 20 providing a surface onto which fuel is injected by injector 16 and upon which a portion of the injected fuel will burn when the engine has reached normal running temperature and the surface of the member 20 has become sufficiently heated. In the illustrated embodiment the member 20 is in the form of a sphere of either solid or hollow construction supported by arms 21 or by a pin or the like extending diametrically of the combustion chamber 14. The member 20 may be formed from any suitable material which is capable of withstanding the high temperatures within the combustion chamber, e.g., a suitable metal such as EN-54, EN-59, 21-4NS or Nimonic 80-110, a suitable sintered ceramic material such as $A1O_2$ with or without the addition of beryllium, or a suitable plastics material such as an HMP plastics of the Hyfil series. The combustion chamber 14 may conveniently be formed in two parts, one part being formed in the cylinder head 1 and the other part in a removable insert 1a retained in position by threaded annular retaining means 1b, and the members 20, 21 may be removably mounted therein so that they can be readily removed and replaced by members 20, 21 of different size or design, thus providing a convenient way of adjusting compression ratio, e.g., to match fuel characteristics. The member 20 preferably occupies from 10 to 50 percent of the volume of the combustion chamber 14.

If required or necessary, there may be provided one or more further combustion chambers 14a communicating with the cylinder 8 by way of transfer passage 15a and having associated means 18a, 19a, 20a and 21a corresponding to the above described means 18, 19, 20 and 21 respectively.

The engine is preferably designed to operate on light hydrocarbon fuels of specific gravity 0.680 to 0.850. In operation air is drawn into the cylinder 8 from the air inlet 7 by way of inlet valve 6 during the induction stroke of the piston 10 and this air is transferred to the combustion chamber 14 by way of transfer passage 15 during the compression stroke of the piston. Also during the compression stroke of the piston fuel is injected under controlled pressure into the combustion chamber 14 by fuel injector 16 and mixes with the transferred air which has a swirl motion imparted thereto to promote mixing as described hereinbefore. The sparking plug 17 is then energized by a conventional high-voltage electric circuit to ignite the fuel/air mixture in the combustion chamber 14, at which time the piston 10 is at the full extent of its compression stroke and substantially closing the transfer passage 15. Products of the combustion expand by way of transfer passage 15 into cylinder 8 to drive the piston downwards on its power stroke whereafter the piston returns and exhaust valve 5 opens to exhaust the cylinder 8 and complete the cycle.

Since the fuel is injected into the combustion chamber 14 during the compression stroke of the piston 10 and not into the cylinder 8, since combustion takes place substantially completely within the combustion chamber 14 and because fuel in the liquid state will burn on the surface of member 20 when this has become heated, very little unburnt fuel will enter the cylinder 8 for emission with the exhaust.

Moreover, due to the compact and concentrated nature of the combustion process attainable in the combustion chamber 14 it is possible to operate the engine with leaner fuel/air mixtures than is possible with a conventional internal combustion engine with the result that nitrogen oxides in the exhaust can be reduced.

In addition, since the fuel is introduced into the combustion chamber by fuel injection, an engine according to the present invention can be provided with a sealed fuel system, thus substantially overcoming the problem of so-called "static emissions" due to the evaporation of fuel from the carburettor of a conventional spark-ignition internal combustion engine.

If desired the internal combustion engine of the present invention may include supercharging means. Such supercharging means may conveniently be driven by energy derived from the exhaust gases emitted by the engine, e.g., may comprise turbocharging means.

What is claimed is:

1. An Otto-cycle internal combustion engine comprising at least one cylinder, a piston reciprocable in said cylinder, means for admitting air into said cylinder for compression by the piston, a substantially spherical combustion chamber externally of the cylinder, transfer passage means freely communicating the combustion chamber with the cylinder and through which air compressed by the piston can freely pass into the combustion chamber and through which products of combustion can freely expand into the cylinder to actuate the piston, means providing a substantially spherical surface located substantially at the center of said chamber onto which fuel can be injected and upon which fuel may burn, fuel injector means for injecting fuel into the combustion chamber to mix with air transferred from the cylinder to the combustion chamber, and ignition means for igniting a fuel/air mixture in the combustion chamber and defining thereby the Otto spark ignition cycle, the arrangement being such that substantially at the moment ignition occurs, the transfer passage means will be substantially closed by the piston so that combustion takes place substantially completely outside the cylinder within the combustion chamber.

2. An internal combustion engine according to claim 1, wherein said means is supported by arms extending diametrically of the combustion chamber.

3. An internal combustion engine according to claim 1, wherein said means occupies from 10 to 50 percent of the volume of the combustion chamber.

4. An internal combustion engine according to claim 1, wherein said means is removable.

5. An internal combustion engine according to claim 1, wherein said transfer passage extends tangentially of the combustion chamber.

6. An internal combustion engine according to claim 1, wherein the engine comprises a cylinder head and said combustion chamber and transfer passage are formed in the cylinder head.

7. An internal combustion engine according to claim 6, wherein the cylinder head has formed therein air inlet and exhaust passages which communicate with said cylinder by way of valve controlled ports.

8. An internal combustion engine according to claim 1, wherein a camshaft is mounted in said cylinder head for actuating said valves.

9. An internal combustion engine according to claim 1, wherein at least one further combustion chamber and transfer passage means is associated with said cylinder.

* * * * *